Patented May 12, 1936

2,040,587

UNITED STATES PATENT OFFICE 2,040,587

6-NITRO-2,3-HYDROXYNAPHTHOIC ACID

Arthur Zitscher, Cronberg in Taunus, Germany, assignor to General Aniline Works, Inc., New York, N. Y., a corporation of Delaware No Drawing. Application June 21, 1935, Serial No. 27,817. In Germany June 26, 1934

1 Claim. (Cl. 260—110)

The present invention relates to 6-nitro-2,3-hydroxynaphthoic acid of the following formula

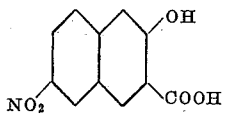

I have found that 6-nitro-2,3-hydroxynaphthoic acid is obtainable by treating in known manner with an agent capable of splitting off the diazo-group, the nitro-compound obtainable by mononitrating the diazo-oxide from 1-amino-2,3-hydroxynaphthoic acid in concentrated sulfuric acid; when the diazo-group is eliminated with the aid of a strong reducing agent there is simultaneous reduction of the nitro-group and the 6-amino-2,3-hydroxynaphthoic acid is obtained.

This amino-2,3-hydroxynaphthoic acid is identical with 6-amino-2,3-hydroxynaphthoic acid described in U. S. Patent No. 1,754,390; the corresponding nitro-product is, therefore, the hitherto unknown 6-nitro-2,3-hydroxynaphthoic acid which is a valuable intermediate product for the preparation of dyestuffs.

The following examples serve to illustrate the invention, but they are not intended to limit it thereto. The parts are by weight unless stated otherwise; the parts by volume have the same ratio to the parts by weight as the liter has to the kilo:

(1) The nitro-compound obtainable as described in German Patent No. 206,698 from 214 parts of the diazo-oxide from 1-amino-2,3-hydroxynaphthoic acid and in the form of a moist press-cake is made into a paste with 15 times its weight of alcohol and mixed with a freshly prepared paste which contains 10 parts of cuprous oxide; the mixture is heated to boiling in a reflux apparatus for 6 hours. It is then filtered boiling hot, the residue remaining on the filter is washed with hot alcohol and the filtrate is concentrated to about ⅕ of its volume. To the residue are added 110 parts by volume of caustic soda solution of 30 per cent strength and 1500 parts by volume of water; the solution thus obtained is filtered and from the filtrate the sodium salt of the 6-nitro-2,3-hydroxynaphthoic acid is precipitated by introducing carbon dioxide. After filtration, the sodium salt is converted into the free acid by stirring it with dilute hydrochloric acid at a somewhat raised temperature. By recrystallization from ortho-dichloro-benzene 6-nitro-2,3-hydroxynaphthoic acid is obtained in the form of yellow coarse needles having a decomposition point of 268° C. (uncorrected). The acid dissolves in caustic alkalies to a blood-red solution and in concentrated sulfuric acid to an orange-yellow solution.

By the action of reducing agents as, for instance, zinc dust and alkali lye, the 6-nitro-2,3-hydroxynaphthoic acid may be converted into the 6-amino-2,3-hydroxynaphthoic acid.

(2) 26 parts of the diazo-oxide from 1-amino-6-nitro-2,3-hydroxynaphthoic acid in the form of an aqueous paste are introduced in small portions at a temperature of about 40° C. into a solution of 150 parts of crystallized sodium sulfide in 150 parts by volume of water, whereby the temperature rises to about 50° C. The mixture is then heated for about half-an-hour at a temperature of 90° C.; after cooling, it is neutralized with acetic acid and filtered. The well washed precipitate is extracted by boiling with sulfuric acid of about 15 per cent. strength, the solution is filtered and the filtrate is saturated with sodium sulfate. After cooling, the sulfate of the 6-amino-2,3-hydroxynaphthoic acid crystallizes in nearly colorless needles. The free 6-amino-2,3-hydroxynaphthoic acid may be obtained therefrom in the form of a grey amorphous powder melting at 298° C. to 299° C. (uncorrected). The 6-acetylamino-2,3-hydroxynaphthoic acid melts at 284° C. to 285° C. (uncorrected), the corresponding benzoyl compound at 290° C. to 291° C. (uncorrected).

(3) To 130 parts of a nitro-compound, obtainable as described in German patent No. 206,698 from the diazo-oxide of 1-amino-2,3-hydroxynaphthoic acid and made up into a paste with 10 times as much by weight of glacial acetic acid or alcohol, there are added at ordinary temperature 115 parts of hydrochloric acid (specific gravity= 1.16) and 1020 parts of a titanous chloride solution of 15 per cent. strength. The whole is then heated to boiling for a short time until the nitrogen is completely split off and poured into water whereby a brown-yellow precipitate of the crude 6-nitro-2,3-hydroxynaphthoic acid separates. The acid is purified by way of the sodium salt, as described in Example 1.

(4) A fine suspension is prepared with 130 parts of the nitration product from the diazo-oxide of 1-amino-2,3-hydroxynaphthoic acid in 30 times their weight of water and at ordinary temperature the calculated amount of a sodium stannite solution is added. The nitrogen splits off at once with self-heating of the mixture and slight frothing. The reaction is finished by a short heating to boiling. After cooling, the whole is acidified with hydrochloric acid, filtered and the crude 6-nitro-2,3-hydroxynaphthoic acid obtained is purified by way of the sodium salt.

(5) 130 parts of 6-nitro-diazo-oxide from 1-amino-2,3-hydroxynaphthoic acid are made up into a paste with 10 times as much by weight of formic acid of 75 per cent. strength. After addition of a small quantity of copper in its finely divided form, known under the trade name natural copper C, the whole is gently heated to boiling during ¼ hour and is then kept boiling until the nitrogen is completely split off. The excess of copper is filtered off, the main quantity of formic acid applied is removed by distillation and the residue is diluted with water. The precipitate of crude 6-nitro-2,3-hydroxynaphthoic acid which separates is purified by way of the sodium salt.

The nitrogen may also be split off from the diazo-oxide group by means of other agents such as, for instance, natural copper C in an aqueous-alkaline medium, the calculated quantity of zinc dust in an aqueous-alkaline solution, the calculated quantities of ferrous chloride in an alcoholic- or glacial acetic acid suspension, aluminium bronze in sulfuric acid, as well as hydroxylamine, hydrazine or phenylhydrazine in an alcoholic suspension.

(6) 130 parts of the nitrated diazo-oxide from 1-amino-2,3-hydroxynaphthoic acid are suspended in 10 times as much by weight of alcohol and, while gently heating to boiling, stannous chloride and hydrochloric acid are gradually added in such quantities as exceed the amounts calculated for splitting off the nitrogen and reducing the nitro group, until a nearly colorless clear solution is obtained. The alcohol is then distilled off, the solid matter is diluted with 10 times its volume of hydrochloric acid of 15 per cent. strength and the tin is removed in the usual manner. The 6-amino-2,3-hydroxynaphthoic acid is obtained from the tin-free solution in the form of the hydrochloride which may be transformed into the free acid in usual manner.

(7) To 130 parts of the nitro-diazo-oxide from 1-amino-2,3-hydroxynaphthoic acid made up into a paste with 30 times as much by weight of water, there are added 300 parts of caustic soda solution of 30 per cent. strength and 80 parts of sodium hydrosulfite. The whole is slowly heated to boiling and this temperature is maintained until the reaction is finished. It is then cooled and the hydrochloride of the 6-amino-2,3-hydroxynaphthoic acid is precipitated with an excess of hydrochloric acid; the hydrochloride contains a small quantity of sulfur. It may be purified by redissolving it in dilute hydrochloric acid and may be converted into the free acid in the usual manner.

Further reducing agents which when applied in the necessary quantity cause a simultaneous deamidizing and reduction of the nitro group, are, for instance, sodium stannite, titanous chloride, zinc dust in an alkaline medium, or the like.

I claim:

The 6-nitro-2,3-hydroxynaphthoic acid of the following formula:

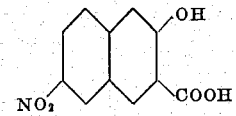

crystallizing from ortho-dichlorobenzene in the form of compact yellow needles of the decomposition point 268° C. and dissolving in caustic alkalies to a blood-red solution, in concentrated sulfuric acid to an orange-yellow solution.

ARTHUR ZITSCHER.